United States Patent Office 3,316,571
Patented May 2, 1967

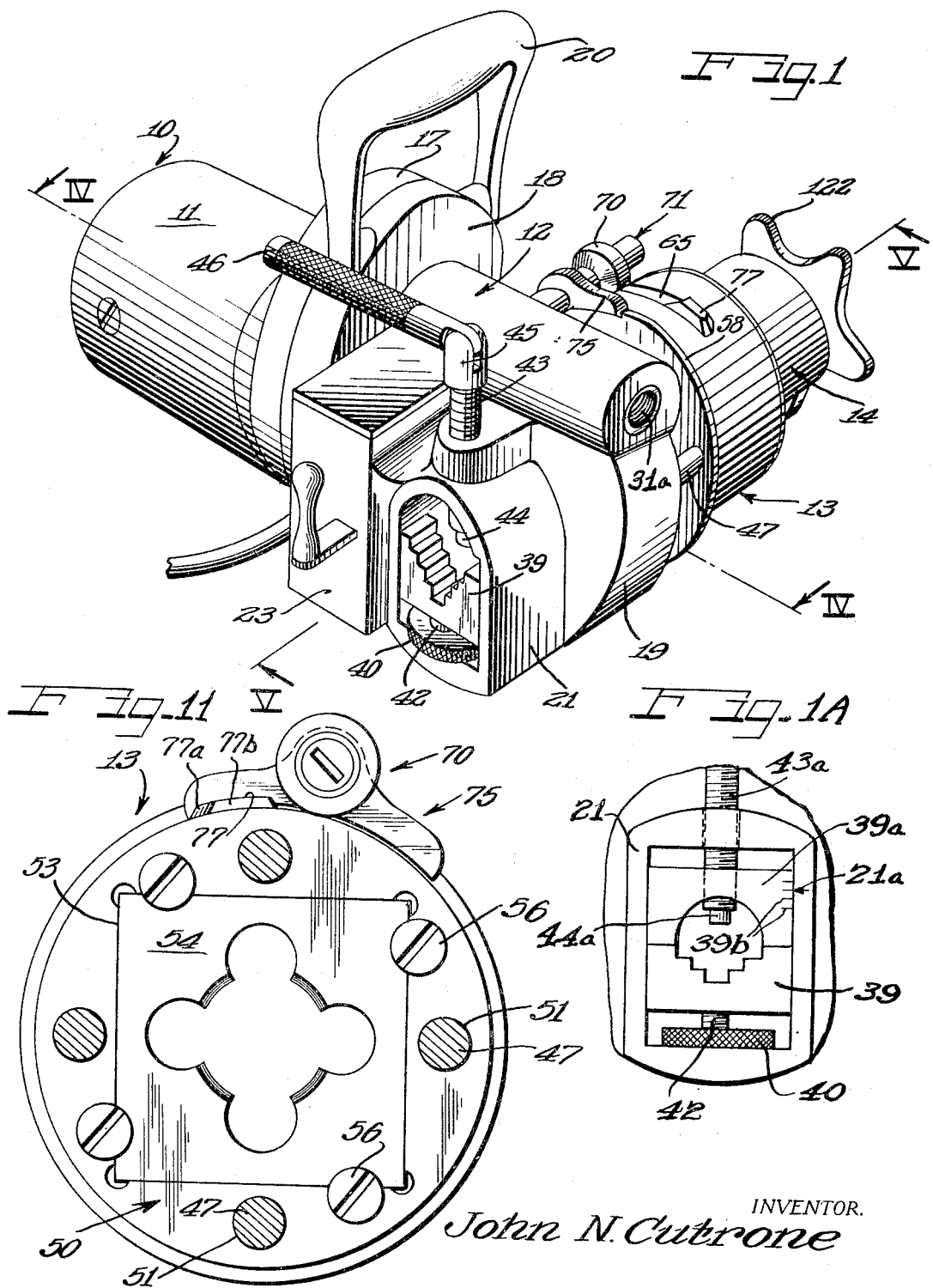

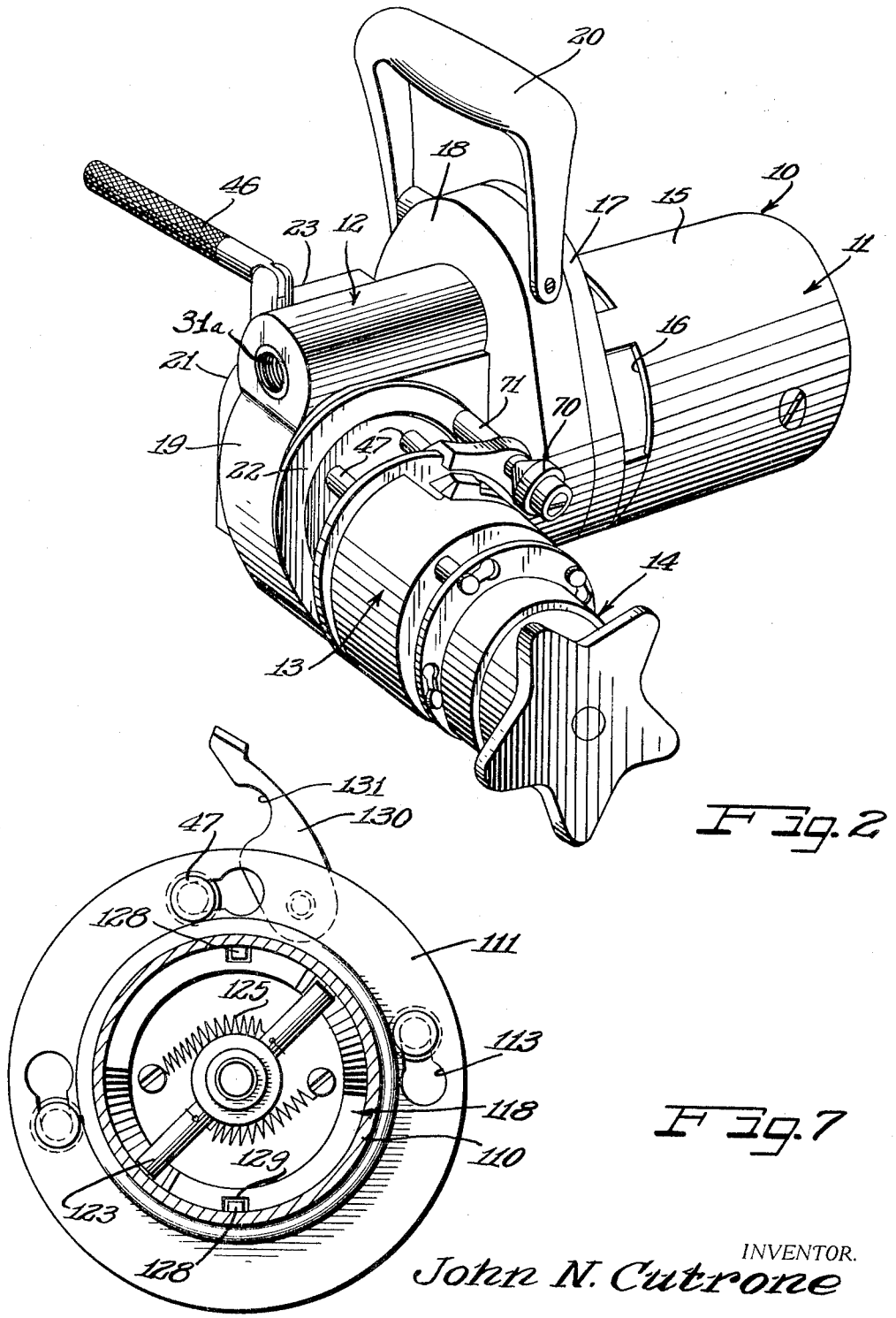

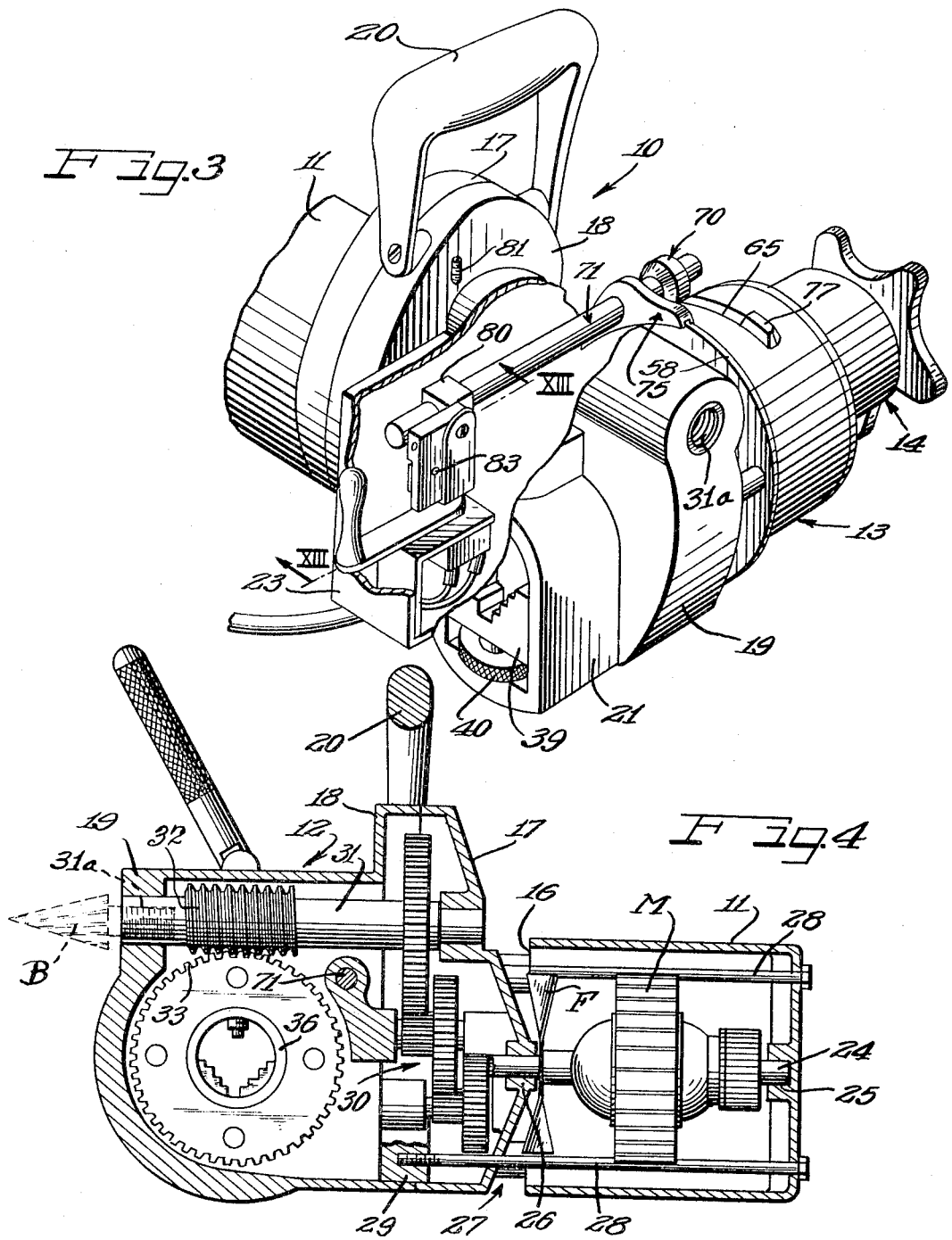

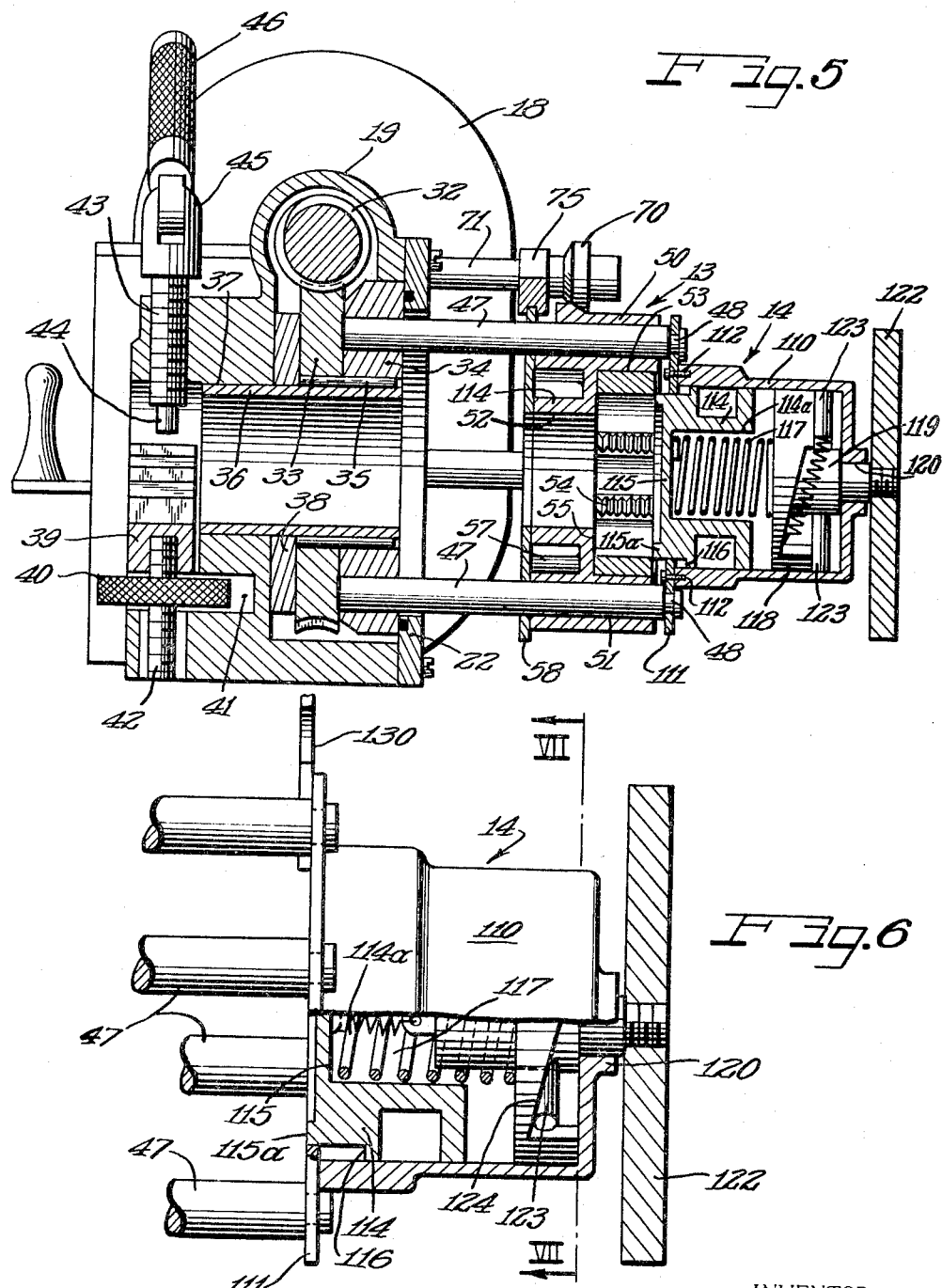

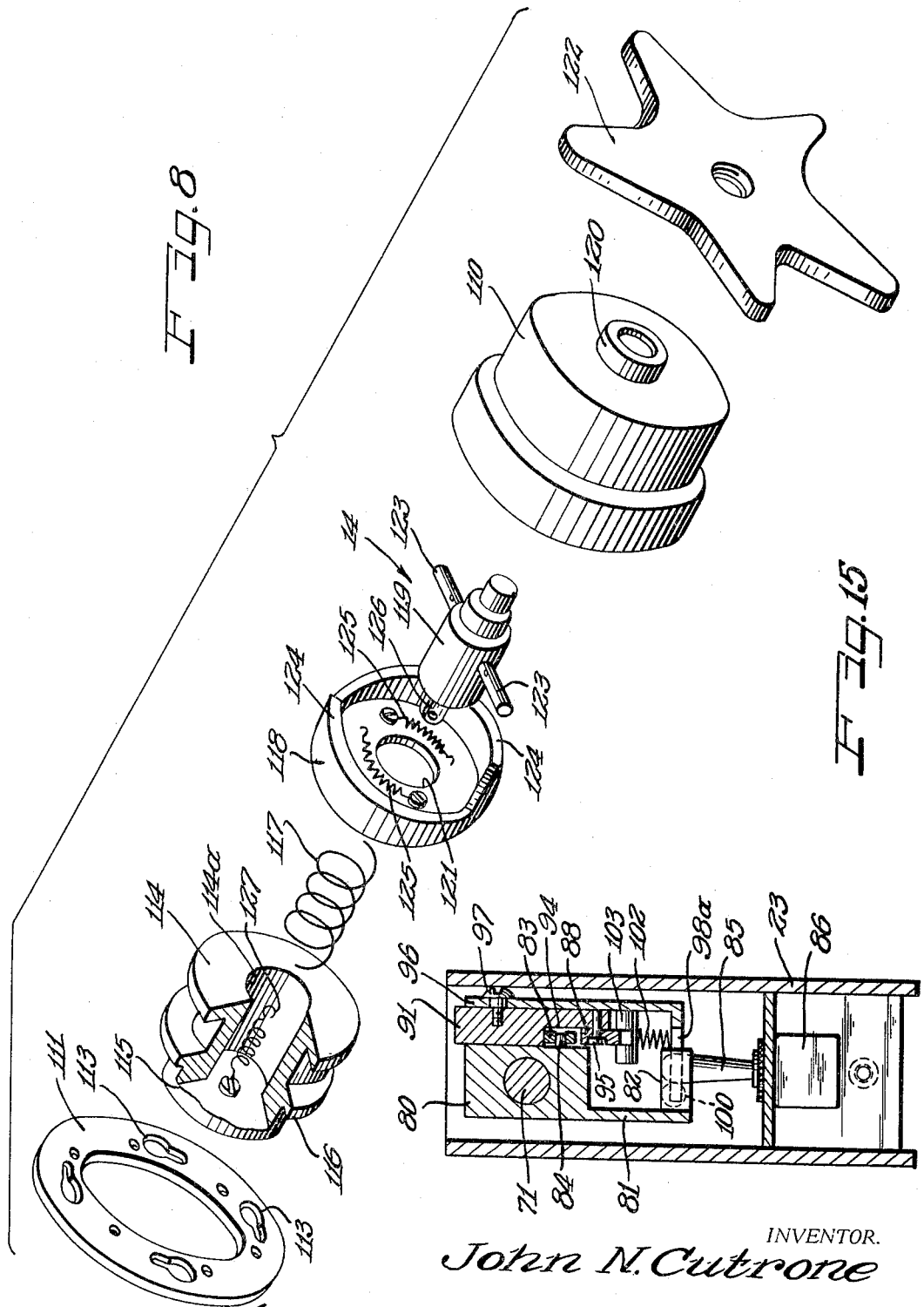

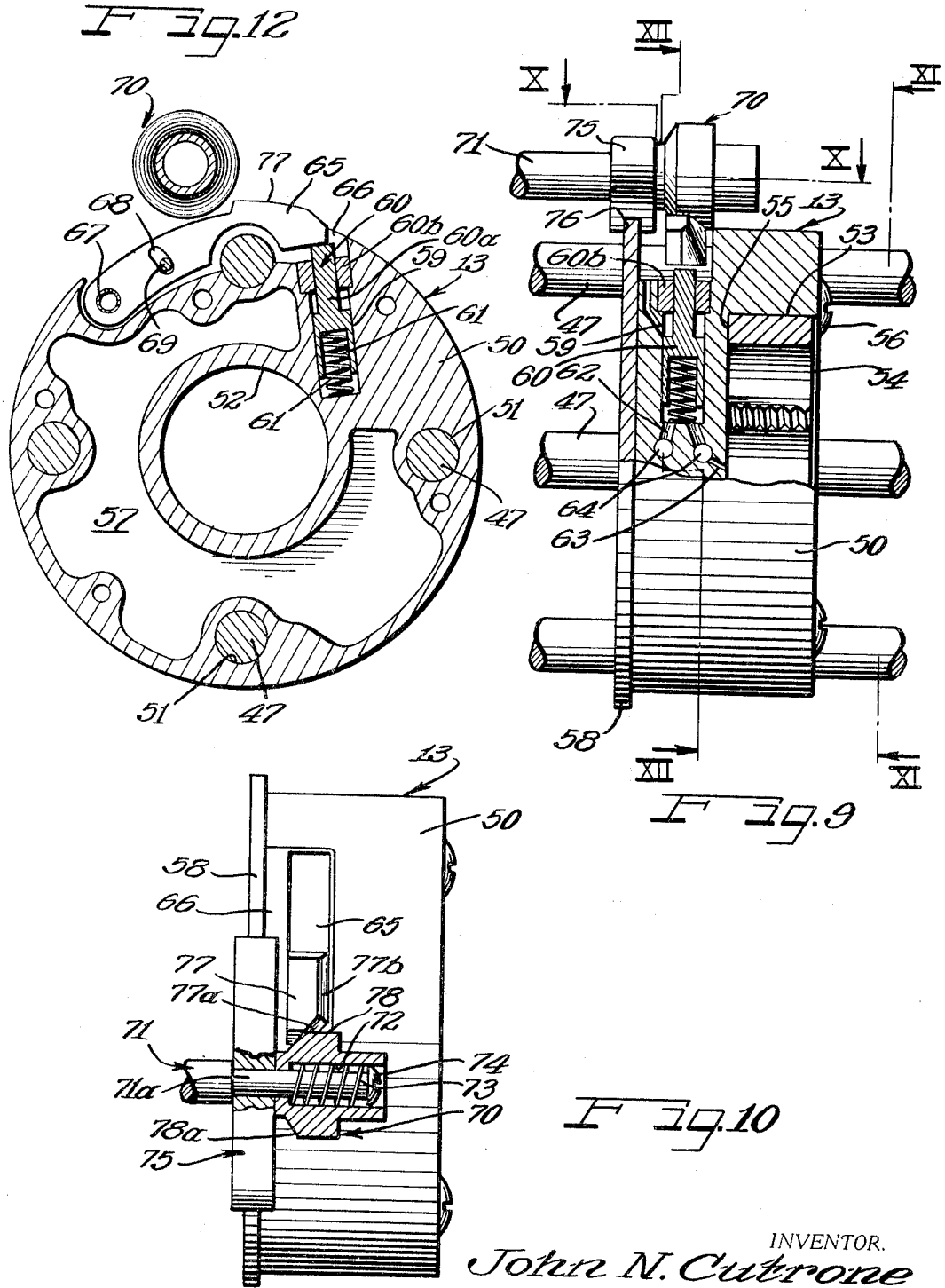

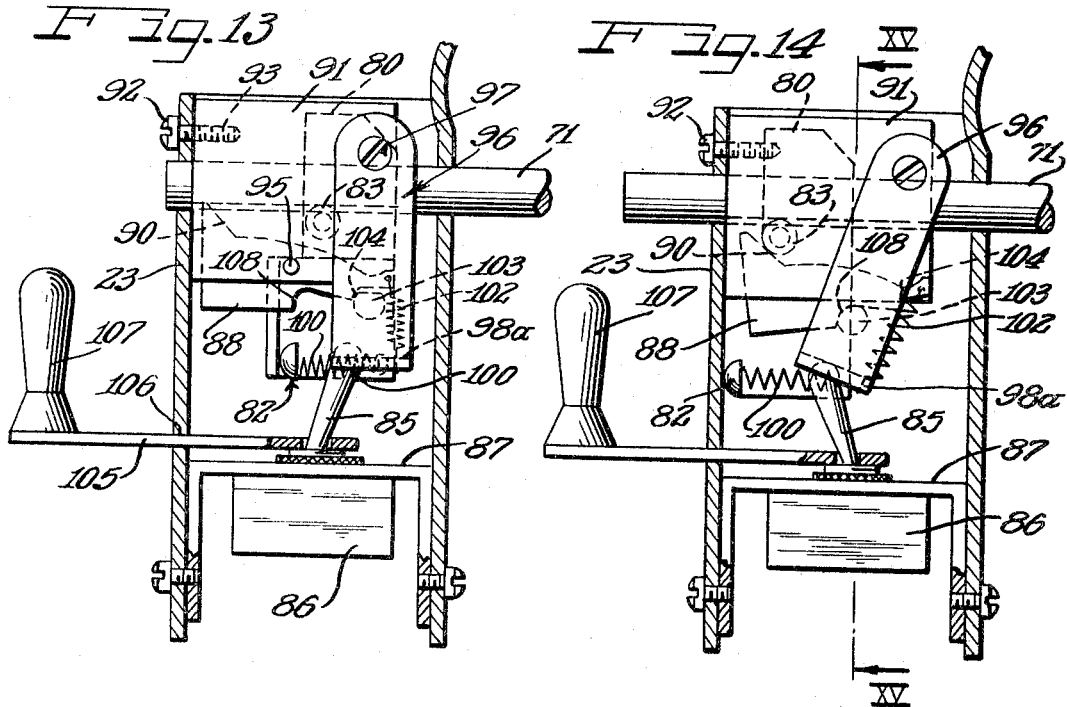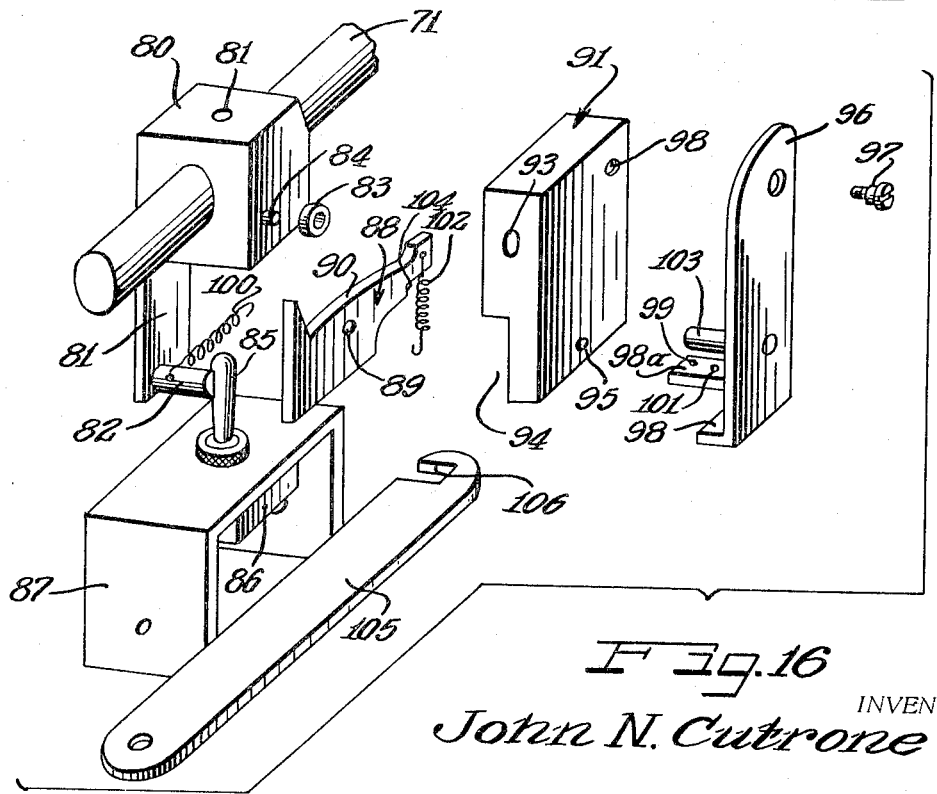

3,316,571
PORTABLE POWER THREADER AND VISE
John N. Cutrone, 6716 Navajo, Lincolnwood, Ill. 60645
Filed Aug. 6, 1964, Ser. No. 387,929
15 Claims. (Cl. 10—89)

This invention relates to a completely automatic portable power tool especially adapted for cutting threads on pipes, rods, bolts, and the like. More specifically this invention relates to a compact lightweight portable electric motor driven pipe threader and vise which automatically reverses and stops after completing a threading cycle and automatically lubricates the cutting tool during the threading operation.

The invention will hereinafter be specifically described as embodied in a pipe threader but it should be understood that the pipe threading die driven by the tool of this invention can be replaced with other types of cutting or broaching tools and therefore the invention is not limited to a pipe threader.

According to this invention there is provided a rugged lightweight power tool that is easily manipulated by one operator who need not be skilled in pipe threading operations. The unit is generally L or T-shaped with a driving motor and a pipe receiving casing in right angle relation. The pipe receiving casing houses a vise for securely gripping an inserted pipe and a ring gear driven by the motor through a gear reduction assembly. A plurality of pins driven by the ring gear project from the end of the housing opposite the vise and a cutting tool supporting carriage is slidably mounted on these pins. A carriage loading unit is detachably mounted on the ends of the pins and is equipped with a cam actuated loading spring. A handle or knob on the outer end of the detachable loading unit actuates the cam. The carriage is equipped with an oil pump which lubricates the cutting tool during the cutting operation. A switch mechanism is provided to automatically reverse the motor when the desired number of threads have been cut to thereby unthread the cutting die off the pipe and to then stop the motor when the unthreading cycle is completed although the device can also be manually stopped and reversed.

In operation, a pipe to be threaded, is inserted through the vise and bottomed against the cutting die. The vise is then tightened to secure the pipe and the handle or knob of the loading device is rotated to spring load the die carriage against the end of the pipe thereby seating the threading die onto the pipe at least for the cutting of the first thread. After the first thread turn has been cut, the die will automatically advance onto the pipe with the pitch of the previously cut thread effecting the advancing movement of the carriage. As the carriage is rotated by the ring gear driven pins an oil pump in the carriage is automatically tripped during each thread cutting revolution for lubricating the dies. When a predetermined length of pipe has been threaded the motor switch is automatically tripped to reverse the motor for unscrewing the die from the pipe and the oil pump is not operated during this reverse rotation of the die carriage. Then when the pipe is free of the cutting die the motor switch is again tripped to stop the motor. The carriage loading device is readily removed from the ends of the pins to give access to the cutting die permitting replacement, size changes, and the like. The vise is also adjustable to accommodate a large range of pipe diameters.

An added feature of the invention is the provision of a secondary cutting tool on the drive mechanism to receive a broach or the like to supplement the thread cutter.

An important feature of the invention is the compactness and portability of the power tool and the arrangement of the driving and driven parts so that a single operator can manipulate the unit in very confined quarters without disassembling the pipe to be cut from its mounting. Thus the unit can be positioned between studs and rafters to act on the ends of pipe carried by such structures. The right angle relationship of the motor and pipe receiving portions of the unit facilitate such use of the unit in confined quarters. Since the unit carries its own vise there is no need for a separate pipe holding tool.

It is then an object of this invention to provide a rugged compact lightweight motor driven portable cutting tool and vise.

Another object of this invention is to provide a portable motor driven pipe threader equipped with a pipe holding vise and having the components thereof so arranged as to permit use of the unit in very small quarters without dismounting pipes to be threaded.

Another object of the invention is to provide a completely automatic power driven pipe threader which reverses and stops after completing a threading cycle.

A still further object of the invention is to provide a compact lightweight portable pipe threader power tool with a self-contained vise which tool is adjustable to accommodate the threading of a large range of sizes of pipes, rods, tubes, and the like.

A further object of the invention is to provide a power driven portable pipe threader with a self-contained vise and having a driven threading die coacting with the vise in such a way as to eliminate the necessity for rotating the pipe to be cut thereby making possible the threading of pipes on location.

A still further object of the invention is to provide a power driven cutting tool with a lubricant pump that automatically lubricates the cutting tool or die only when a cutting operation is being performed.

A still further object of the invention is to provide a portable power driven pipe threader with a detachable device for loading the threading die against the workpiece to initiate the threading operation.

A still further object of the invention is to provide a compact portable power driven pipe threader adapted to receive a pipe therethrough and having an adjustable pipe vise at one end and a detachable threading die loading member at the other end wherein the loading member can be removed to permit passage of the pipe beyond the end of the unit.

Other and further objects of this invention will be apparent to those skilled in this art from the following detailed description of the annexed sheets of drawings showing a preferred embodiment of the invention.

On the drawings:

FIGURE 1 is a perspective view of the portable power threader and vise of this invention.

FIGURE 1A is a fragmentary end view of a modified vise arrangement for the power threader of FIG. 1.

FIGURE 2 is a perspective view similar to FIG. 1 but taken from the opposite side.

FIGURE 3 is a perspective view similar to FIG. 1 but with parts broken away to show underlying parts.

FIGURE 4 is a longitudinal cross sectional view taken generally along the line IV—IV of FIG. 1.

FIGURE 5 is a transverse cross sectional view taken substantially along the line V—V of FIG. 1.

FIGURE 6 is a fragmentary side elevational view with parts in vertical cross section of the loading device on the righthand end of the unit of FIGS. 1 to 3.

FIGURE 7 is a transverse cross sectional view, with parts in elevation, taken substantially along the line VII—VII of FIG. 6.

FIGURE 8 is an exploded perspective view of the components of the loading device of FIGS. 6 and 7.

FIGURE 9 is a side elevational view of the carriage of the unit of FIGS. 1 to 3, with parts broken away and shown in cross section.

FIGURE 10 is a top plan view, with parts in horizontal section, taken along the line X—X of FIG. 9.

FIGURE 11 is an end elevational view taken generally along the line XI—XI of FIG. 9.

FIGURE 12 is a cross sectional view taken substantially along the line XII—XII of FIG. 9.

FIGURE 13 is a cross sectional view, with parts in front elevation, of the switch and trip mechanism taken substantially along the line XIII—XIII of FIG. 3.

FIGURE 14 is a view similar to FIG. 13 but showing the switch tripped to the reverse position.

FIGURE 15 is a cross sectional view taken substantially along the line XV—XV of FIG. 14.

FIGURE 16 is an exploded perspective view of the switch and tripping mechanism components of FIGS. 13 to 15.

As shown on the drawings:

The portable power threader and vise 10 of this invention shown in FIGS. 1 and 2 includes a motor casing 11, a gear casing 12, a carriage 13 and a loading device 14. The motor casing 11 is a cylindrical cup 15 with an open front end 16 spaced behind the gear casing 12. The gear casing 12 includes a cover 17 extending across the open end 16 of the motor casing in spaced forward relation therefrom and closing a head 18 with a front wall from which projects a rib-like casing body 19 with opposite flat sides and a generally cylindrical dome. A handle 20 is pivotally mounted on the top portion of the casing head 18.

The body 19 has an integral vise housing 21 projecting laterally from the leftside face thereof as viewed from FIGS. 1 and 2 while the opposite side of the body 19 has an annular rim portion 22 surrounding a large diameter opening. A switch box 23 is positioned between the vise housing 21 and the head 18 in integral relation with the body 19.

As shown in FIG. 4 the casing 11 houses an electric motor M with a rotor shaft 24 journaled at one end in a bearing support 25 provided by the end wall of the casing 11 and journaled at the other end in a bearing support 26 provided by the cover 17. As shown a gap 27 is provided between the open end 16 of the casing 11 and the cover 17 for air flow to fan blade F on the shaft for circulating air through the motor casing. Elongated staybolts 28 extend through the casing 11 and are threaded into lugs such as 29 provided in the head 18 of the casing 12.

The motor shaft 24 is geared through a chain of reduction gears 30 journaled in the casing 12 and head 17 to drive a worm shaft 31 with a worm 32 positioned in the cylindrically domed top of the body 19. This worm 32 drives a ring gear 33 which, as shown in FIG. 5, is affixed to the side face of a head ring 34 mounted just inside the annular rim plate 22 on the righthand side wall of the body 19. The ring gear 33 and head ring 34 are rotatably supported on needle bearings 35 from a journal tube 36 spanning the center of the body 19 and secured in a bore 37 extending through the vise body 21 into the center of the casing body 19. The plate 22 overlies the ring head 34 to coact with a spacer washer 38 between the ring gear 33 and the side wall of the casing body 19 for centering the ring gear and ring head on the journal tube 36.

The worm shaft 31 has an exposed end at the end face of the domed top of the body 19 which is preferably tapped as at 31a to provide a mounting for a supplemental tool such as a broach B (FIG. 4). Such a supplemental tool can be used to broach pipes which are threaded by the main cutting die of the unit.

The vise housing 21 as shown in FIGS. 1 and 5 carries a pipe receiving jaw or chuck 39 which is vertically slidable in the housing 21 and is actuated by a knurled nut 40 seated in a pocket 41 of the housing and threaded onto a stud 42 depending from the jaw 39. As shown in FIG. 1 the periphery of the nut 40 projects beyond the vise housing 21 so that it is easily accessible for manual rotation to raise and lower the stud 42 and thus position the jaw 39 at the desired level in the housing 21. The top of the housing 21 has a stud 43 threaded therethrough with a reduced diameter hardened end 44 overlying the central portion of the jaw 39 to coact with the jaw for securing a pipe in fixed position thereby completing the vise for gripping the pipe. The opposite end of the stud 43 has a slotted head 45 in which is pivoted the end of a handle 46 to apply torque to the stud.

The modified vise of FIG. 1A relieves the torque load from the casing 21 and also gives a visual reading of the level of the jaw in terms of pipe diameter to level the pipe with the thread cutter. In FIG. 1A the jaw 39 has a top saddle 39a fixed thereon and the assembly of jaw and saddle slide in the housing 21. The level of the assembly in the housing 21 is controlled by the same nut 40 and stud 42 arrangement of FIG. 1 and the level is indicated by indicia 39b on the saddle 39a to be aligned with an arrow 21a on the housing 21. Thus the proper levels of the jaw assembly for different diameter pipes to be threaded can be shown. The stud 43a instead of being threaded in the housing 21 is merely passed through a hole in the top of the housing and is threaded through the saddle 39a to press its end 44a against the pipe in the jaw assembly. This relieves strain from the housing which may be an aluminum casting and the load is borne by the saddle 39a which is preferably steel. Thus the nut 40 levels the jaw assembly in the housing to center the various sized pipes with the cutting tool and the stud 43a locks the pipe in the jaw assembly.

As shown in FIGS. 5 and 6 four pins or rods 47 project horizontally beyond the open rightside of the casing body 19. Each of these pins is securely affixed to the ring gear 33 and ring head 34 in equal spaced relation around the periphery thereof and has a clearance relation with the rim plate 22. The free ends of the pins have peripheral grooves 48 therearound. The tool carriage 13 is slidably mounted on the pins and the loading device 14 is detachably mounted on the grooved ends 48 of the pins.

As shown in FIGS. 5 and 9 to 12 the carriage 13 is generally a cylindrical block 50 with holes 51 therethrough receiving the pins 47 and with a central cylindrical bore 52 extending to a square recess 53 receiving the threading die 54 which is bottomed on the shoulder 55 between the bore 52 and recess 53 and is held in the recess by screws 56 threaded in the block 50 and having heads overlying the die as best shown in FIG. 11. The bore 52 is held by the pins 47 in alignment with the journal tube 36.

The inboard end of the block 50 in recessed at 57 around the bore 52 to provide an oil reservoir which is closed by an end ring plate 58 secured to the inboard face of the block 50 and projecting beyond the periphery of the block to provide a track as will be more fully hereinafter described.

As best shown in FIGS. 9 and 12 a well 59 is provided in the block 50 and a plunger 60 is slidably mounted in this well and is spring biased by a spring 61 away from the bottom of the well. A first passageway 62 connects the bottom of the well 59 with the recess 57 while a second passageway 63 connects the well bottom with the recess 57 to discharge to the interior of the threading die 54 in the recess. If desired ball checks 64 can be provided in the passages 62 and 63 to accommodate flow from the reservoir 67 into the well 59 and from the well to the recess 53. The plunger 60 has a hollow inner end coacting with the well to provide a suction chamber on its upstroke and a compression chamber on its downstroke. The plunger 60 has a stem top 60a guided in a seal bushing 60b seated in a counterbore of the well 59 and a lever 65 overlies the top of the plunger to act thereon. The lever is pivoted in a slot 66 in the periphery of the block on a pin 67 at the end thereof opposite the end which overlies the plunger. The arrangement is such that when the lever is depressed into the bottom of the slot 66, the plunger is pushed to the bottom of the well 59 and oil is discharged from the well through the bore 63 to the die 54 and when the lever is released the spring 61 is effective to raise the plunger in the well to draw oil from the reservoir 52 into the well 59.

A slot 68 (FIG. 12) is provided in the lever 65 to receive a pin 69 secured in the carriage 50 and extending across the slot 66 to limit the swinging movement of the lever so that its free end will remain in light contact with the end of the piston 60 even when the lever moves to its outmost position in the slot 66.

The lever 65 is actuated by a cam roller 70 which is rotatably mounted on a control rod 71. As best shown in FIG. 10 the rod 71 has a reduced diameter end 71a on which the roller 70 is journaled. The roller has a hollow hub portion 72 receiving a compression spring 73 which surrounds the reduced diameter end 71a and a screw 74 threaded in the end of the portion 71a retains the spring 73 on the end 71a. The cam roller is thus spring urged against a shoe 75 which is fixed to the control rod 71 and has a groove 76 (FIG. 9) receiving the periphery of the plate 58 so that the rod 71 moves laterally with the carriage 13 but does not rotate with the carriage.

When the carriage 13 is rotated in a thread cutting direction (clockwise as viewed in FIG. 11) the shoe 75 moves therewith to pull the control rod 71 to the left and the lateral relationship of the cam roller 70 and pump lever 65 remains constant.

As shown in FIGS. 9 and 10 the lever 65 has a raised cam head 77 on the free end thereof in the path of the cam roller 70 and this head has a beveled trailing end 77a diverging to a beveled outer side 77b. The cam roller in turn has a circular head 78 intermediate the ends thereof with a beveled front face 78a. When the carriage 13 rotates in the thread cutting direction (clockwise in FIG. 11, counterclockwise as viewed in FIG. 12) the head 78 of the roller rides over the cam head 77 to depress the lever and actuate the pump. However, during the unthreading operation the carriage 13 rotates in the opposite direction and the cam roller face 78a first engages the beveled end 77a of the cam head 77. This throws the cam roller to the side 77b of the head 77 and the spring 73 allows the cam roller to shift on the rod end 71a so that the roller 70 will ride along the side 77b of the head 77 without depressing the lever 65.

Therefore the periphery 78 of the cam roller 70 will ride over the top of the cam head 77 to depress the lever 65 thereby creating the pumping action only when the carriage 13 is rotated in the thread cutting direction and moves to the left as viewed in FIG. 9. During the reverse rotation of the carriage, the cam roller rides alongside the lever head 77 and does not depress the lever 65. It will thus be understood that oil is supplied to the cutting die 54 only during an actual cutting operation when the carriage 13 is moving to the left toward the casing 19.

The control rod 71 as best shown in FIGS. 1 and 2 is journaled in the rim plate 22 of the casing 19 and extends into the switch box 23 where, as is shown in FIGS. 3 and 16, it receives a control block 80 in adjustable relation thereon. The block 80 is affixed to the rod 71 by a set screw 81 with a pointed end adapted to bite into the rod so that the block can be set in a fixed position selectively along the length of the rod. The block 80 has a depending leg 81 on the back end thereof carrying a forwardly projecting pin 82. On the front face of the block 80 there is provided a small roller 83 on a lug 84 projecting from the block above the bottom and near the front edge of the block. The pin 82 coacts with the handle 85 of a toggle switch 86. This switch 86 is mounted under a bracket 87 carried by the casing 23 as shown in FIGS. 13 to 15 with the handle 85 projecting through the top of the bracket. The switch is of the toggle type having a neutral position when the handle is upright, a forward position when the handle is tilted to the right as viewed in FIG. 13 and a reverse position when the handle is tilted to the left as viewed in FIG. 14. The neutral center position of the handle of course disconnects the power input to the motor M while the forward position drives the motor in one direction to effect the threading operation thereby shifting the carriage 13 to the left or toward the casing 19 while the reverse position with the lever tilted to the left reverses the current to the motor for unthreading the die off of the pipe.

A trip lever 88 is pivoted about an axis 89 and has a cam top 90 on which the roller 83 rides. A mounting block 91 overlies the roller carrying face of the adjustable block 80 and is secured to the front wall of the casing 23 by a screw 92 threaded into a tapped hole 93 in the side wall of the block. The block 91 has a slot 94 extending across the bottom thereof to provide a space receiving the roller 83 and the trip lever 88 as shown in FIG. 15. A pin 95 carried by the block 91 extends through the aperture 89 of the lever 88 to swingably support the lever on the block.

A bracket 96 overlies the outer face of the cover block 91 and is pivotally mounted thereon by a pin 97 threaded into a tap hole 98 in the upper righthand corner of the block as viewed in FIG. 16. This bracket 96 has a bottom flange 98 of L-shaped configuration with an extended leg 98a at the rear end thereof as viewed in FIG. 16. This extended leg has an outboard hole 99 therethrough for anchoring a spring 100 mounted on the pin 82 and an inboard hole 101 for anchoring a spring 102 mounted on the rear end of the lever 88. The flange 98 is spaced below the block 91.

A pin 103 is mounted on the bracket 96 and extends horizontally in spaced relation above the flange 98 to engage a shoulder 104 of the lever.

A flat metal slide 105 is slidably mounted in a slot 106 provided in the outer face of the casing 23 and overlies the bracket 87. A slot 106 is provided in the inner end of this slide to provide a hook for embracing the switch handle 85 near the base thereof. The outer end of the slide has an upright handle 107 secured thereon. When the handle 107 is pushed toward the casing 23 the hook end of the slide 105 will tilt the switch handle 85 to the right as viewed in FIG. 13 thereby closing the switch for driving the motor in a forward direction. The switch handle 85 engages the extended flange leg 98a of the bracket to move the bracket to the vertical position of FIG. 13 in which position the spring 100 is stretched and the bracket pin 103 is brought behind the lever shoulder 104 whereupon the spring 102 pulls the lever to the horizontal position of FIG. 13. Then as the control rod 71 moves the block 80 to the right from the position shown in FIG. 13 to the position shown in FIG. 14 the roller 83 rides against the upturned end of the cam track 90 of the lever 88 thereby depressing the lever and moving the shoulder 104 above the pin 103. The stretched spring 100 then pulls the bracket 96 to the left as viewed in FIG. 14 causing the flange leg 98a of the bracket to tilt the switch handle 85 to the left thereupon reversing the current feed to the motor and unwinding the cutting die off of the pipe. When the pin 103 is released from the shoulder 104 it is bottomed against a second shoulder 108 on the lever 88. Then as the block 80 is pulled to the right as viewed in FIG. 14 by the control rod 71 it carries the lever 88 therewith and the shoulder 108 bears against the pin 103 to tilt the bracket 96 back to the vertical position of FIG. 13 with the pin 103 engaged behind the shoulder 104. However the pin 82 carried from the advancing block 81 trails the shoulder 108 sufficiently so that the switch handle 85 is not engaged by this pin until the roller 83 has ridden off of the high spot 90 of the lever cam and the lever has been pulled by the spring 102 back to its horizontal position of FIG. 13. The pin 82 then engages the handle 85 to snap it to the vertical position midway between the forward and reverse tilting position. This central vertical position shuts off the current supply to the motor and the operation stops. The assembly is then ready for the next operation which is initiated by pushing the slide 105 inwardly to tilt the switch handle 85 from its vertical central neutral position to the tilted position of FIG. 13.

Since the block 80 is adjustably locked on the control rod 71 the point of initiation of the reversing operation can be varied to vary the length of the threads cut on the pipe.

The die starter or loading device 14 is best shown in FIGS. 5 to 8 as including a cup-shaped housing 110 with a ring plate 111 secured around the open end thereof as by means of mounting screws 112. The plate 111 projects both radially inwardly and outwardly from the open mouth of the cup 110 and has four key slots or bayonet slots 113 spaced circumferentially therearound for receiving the pins 47 therethrough. The large end of the slots 113 fit over the ends of the pins 47 so that the plate 111 may be bottomed against the shoulders provided at the bases of the grooves 48 and rotation of the plate to move the small end of the slots 113 into the grooves 48 provided at the ends of the pins will retain the assembly 14 on the ends of the pins in overlying aligned relation with the carriage 13.

A piston 114 is slidably mounted in the casing 110 and has a head 115 with a peripheral rim 115a adapted to be bottomed on the threading die 54 in the carriage 13. The head 115 of the piston is of reduced diameter to fit through the aperture in the plate 111 and a shoulder 116 is provided at the base of this reduced head portion to bottom on the inwardly projecting portion of the plate 111 thereby retaining the piston in the casing 110.

The piston has a central well 114a receiving a compression spring 117 which is bottomed on the head 115 and also on a cam actuator 118 slidably mounted in the casing between the end wall of the casing and the piston. A shaft 119 is rotatably mounted in a boss 120 on the end wall of the casing 110 and projects through a central aperture 121 in the cam actuator 118. A handle or knob 122 is threaded on the shaft 119 outside of the boss 120 to rotate the shaft and to retain it in the boss. Pins 123 extend radially from the shaft 119 immediately adjacent the end wall of the casing to ride on cams 124 formed on the periphery of the actuator 118. Tension springs 125 have the opposite ends thereof respectively anchored on the pins 123 and on the head of the actuator in spaced relation outwardly from the aperture 121. The springs are biased so as to rotate the shaft 110 to the low spots of the cams.

The shaft 119 has a lug 126 on the inner end thereof receiving one end of a tension spring 127, the other end of which is anchored to the piston head 115.

When the knob 122 is rotated to cause the pins 123 to climb the cams 124 the actuator 118 will be forced against the spring 117 to compress the spring thereby forcing the piston 114 against the die 54 and in turn loading the die against the edge of the pipe to be cut. As shown in FIG. 7 opposed lugs 128 on the casing 110 project into slots 129 in the actuator 118 to prevent rotation of the actuator with the shaft and pins 123.

As shown in FIGS. 6 and 7 a locking lever 130 is pivotally mounted on the plate 111 to block off the large end of one of the keyhole slots and to receive the pin 47 of that slot in a pocket 131 thereby preventing rotation of the plate 111 to an unlocking position.

OPERATION

From the above descriptions it will be understood that the pipe threader 10 of this invention is a generally T-shaped unit with one leg of the T housing an electric motor and a train of reduction gears while the other leg of the T contains a pipe vise, a threading die carriage driven by the motor and slidable toward and away from the vise, a detachable die starter or device for loading the threading die against the end of a pipe held by the vise, an automatic oiler in the carriage for lubricating the die and a switch tripping mechanism which automatically controls the operation through a threading cycle and a reversing cycle so that the unit may be left unattended after initiation of the threading operation. It will also be understood that the unit of the invention is portable, easily manipulated by one operator, who need not be skilled, and is well adapted for "on location" use without disconnecting pipes from their mountings.

Specifically the electric motor M of the unit 10 drives a gear reduction train 30 to drive a worm 32 meshed with a hollow ring gear. The worm can be used to drive a supplemental tool such as a broach for pipes, etc. The pipe vise is mounted on one side of the ring gear and contains an adjustable pipe receiving jaw 39 shiftable by a knurled nut 40 to align different sized pipes with the aperture of the ring gear. The vise is tightened by a handle 46. The ring gear drives a plurality of pins 47 on which is slidably mounted a carriage assembly 13 housing the die cutter 54 and having built therein an oil reservoir and oil pump tripped by the roller 70 and cam lever 65 to eject oil onto the threads being cut by the threading die. During reverse rotation of the carriage the cam roller is shifted on the rod 71 by the beveled end 77a of the cam lever 65 to ride alongside the cam head 77 so that the lever is not depressed and the pump is not actuated.

A detachable thread starting or loading device 14 is mounted on the ends of the pins 47 and has an operating knob 122 which shifts pins 123 to depress an actuator 118 against a compression spring 117 for loading a piston 114 against the face of the threading die 54 in the carriage thereby pressing this die against the end edge of a pipe secured by the vise and initiating the thread cutting operation. The starting device 114 is easily detached from the ends of the pins by releasing a locking lever 130 and by rotating the device so that the large ends of the bayonet or keyhole slots 113 are placed over the pin ends whereby the device can be retracted to give access to the cutting die 54 for replacement or size change. Obviously many different types and sizes of threading dies can be used in the carriage 13.

Once the cutting operation is started the control rod 71 is pushed by the shoe 75 which rides on the carriage track 58 of the carriage 13 to shift the block 80 of the tripping mechanism in the switch compartment 23 of the unit. This block 80 carries a cam roller 83 which rides on the cam edge 90 of a tripping lever 88 to depress the lever and move the shoulder 104 thereof off of the pin 103 whereupon the bracket 96 is pulled by the spring 100 to bottom the pin 103 against the second shoulder 108 of the lever 88 while at the same time tilting the switch handle 85 from the forward threading drive position to the reverse unwinding position as viewed in FIGS. 13 and 14.

As the control rod 71 is pulled to the right as viewed in FIG. 14 during the unwinding of the threading die off of the pipe the cam roller 83 on the block 80 is retracted from the high spot of the cam 90 of the tripping lever 88 and the spring 102 is effective to pull the lever 88 to its horizontal position. In addition the pin 82 carried by the block 80 engages the switch handle 85 to move the handle to the vertical neutral position of the switch and at the same time move the bracket 96 to its vertical position with the bracket pin 102 again engaged behind the shoulder 104 of the lever 88. The energizing current to the motor is then shut off and the unit will stop.

The pipe is removed from the unit by loosening the vise, a new pipe then is inserted, the knob 122 is rotated to load the cutting die against the end of the pipe and the handle 107 is pushed to move the slide 105 into the switch box 23 for tilting the switch handle 85 to the forward position thereupon starting the motor for the next threading operation. Since the block 80 is adjustable on the rod 71 the length of thread cutting is adjustable.

If desired of course the tools of this invention can be equipped with different type of switches and the automatic reversing and stopping feature may be replaced with a manual start, stop and reverse switch.

It will of course be appreciated that many of the details of the preferred described device can be varied without departing from the principles of this invention and the scope of the invention is therefore not to be limited beyond the scope of the hereinafter appended claims.

I claim as my invention:

1. A portable pipe threader and vise which comprises an electric motor, a gear housing supporting said motor and having reduction gears rotatably mounted therein driven by said motor, a worm driven by said reduction gears in said casing, a ring gear driven by said worm in said casing, a vise on one side of said ring gear on said casing, a tool carriage support projecting from said ring gear on the opposite side of said casing remote from said vise, a tool carriage slidably mounted on said support means and movable toward and away from said ring gear, said vise effective to hold the workpiece through said ring gear against a cutting tool in said tool carriage, detachable means on said tool carriage effective to load the tool therein against the end of a workpiece held by said vise, and switch mechanism actuated by said tool carriage for reversing and subsequently stopping said motor upon completion of a cutting operation.

2. A portable pipe threader and vise which comprises a generally T-shaped housing having an electric motor in one leg thereof, a vise at one end of the other leg thereof, a ring gear in said other leg aligned with said vise and adapted to receive a pipe therethrough held by said vise, driving pins carried by said ring gear and projecting therefrom away from said vise, a tool carriage slidably mounted on said driving pins having a pipe thread cutting die receiving recess therein, a starting device detachably mounted on the ends of said pins for loading a die in said carriage against a pipe secured by said vise, a knob on said loading device for actuating the loading device, said carriage having an oil chamber therein, an oil pump in said carriage, means for actuating said oil pump only when said carriage is driven to effect a thread cutting operation, and switch mechanism actuated by the carriage to reverse and subsequently stop the motor upon completion of a threading operation on a pipe in the carriage.

3. A portable unitary pipe threader and vise which comprises a generally T-shaped unit having an electric motor in one leg thereof, a ring gear driven by said motor in the other leg thereof disposed at right angles to the axis of the motor, a pipe holding vise in one end of said other leg, a pipe threading die carriage on the other end of said leg slidably mounted toward and away from said ring gear and driven by the ring gear, a demountable cup-shaped starting device acting on said carriage for loading the thread cutting die therein against the end of a pipe held by said vise, a cam in said device, a knob on said device for actuating the cam into loading position, and means actuated by the sliding of the carriage toward and away from the ring gear for controlling operation of the motor.

4. A compact portable pipe threader and vise which comprises a generally T-shaped unit with an electric motor in one leg thereof and a pipe receiving vise and tool carriage in the other leg thereof, said tool carriage on said other leg being movable toward and away from said vise, and a demountable starting unit acting on said carriage to start the threading operation, said starting unit including cam means for urging the carriage toward the vise and a rotatable handle for actuating said cam.

5. A portable power tool which comprises a T-shaped unit having an electric motor in one leg thereof and a workpiece receiving casing in the other leg thereof, a vise at one end of said casing adapted to secure a workpiece projected through the casing, a tool carriage support projecting from the opposite end of the casing, a tool carriage slidable on said support for carrying a tool for acting on the workpiece, driving means connecting said motor with said tool carriage support to rotate the tool carriage around the workpiece, and demountable means on the other leg for selectively urging the tool carried by the carriage against a workpiece held by said vise.

6. In a portable pipe threading power tool having a pipe receiving casing with a vise at one end thereof for securing a pipe to project beyond the opposite end of the casing, a rotating drive support carried by said casing and projecting from said opposite end therefrom, a cutting die carriage slidably mounted on said support for carrying a threading die against the projected end of a pipe secured in said vise, said carriage having an oil reservoir therein, an oil pump on said carriage for pumping oil from the reservoir to the die in the carriage, and mechanism for actuating the oil pump only during rotation of the carriage in a thread cutting direction and ineffective to actuate the pump when the carriage is rotated in the opposite direction.

7. A portable power driven pipe threader which comprises a casing carrying an electric motor, a reduction gear train, a worm driven by said train and a gear driven by said worm adapted to receive a pipe therethrough, means projecting from said casing driven by said gear, a cutting die carriage slidably mounted on said means for rotation with the means and for sliding movement toward and away from the gear, a reversing switch in said casing controlling operation of said motor, a trip mechanism actuating said switch, a shoe riding on said carriage controlling said trip mechanism effective to actuate the mechanism for reversing the motor at the end of a cutting operation and for stopping the motor at the end of the reversing cycle.

8. In a power driven cutting tool having a reversible electric motor and a slidably mounted tool carriage arranged to surround the workpiece and move lengthwise of the workpiece, the improvement of a switch mechanism for controlling said motor which comprises a control rod actuated by sliding movement of the carriage, a cam roller carrying block adjustably mounted on said control rod, a trip lever pivotally mounted in front of said block having a cam track acted on by said cam roller, a bracket pivotally mounted over said trip lever, a pin on said bracket, a shoulder on said trip lever engaging said pin to hold the bracket against swinging movement, a toggle switch energizing said motor having a handle with an upright neutral position, a forwardly tilted forward drive position and a rearwardly tilted reverse drive position, an abutment means on said adjustable block and on said bracket engaging opposite sides of said handle for shifting the handle from a forward position to a reverse position and then back to a neutral position, and said cam roller on the adjusting block being effective to trip said tripping lever for releasing the bracket to shift the handle from a forward to a reversing position upon completion of a cutting operation by the tool carriage.

9. In a power driven portable pipe threader having a reversible motor and a pipe receiving threading die carriage driven by said motor around the pipe, the improvement of a switch having a neutral position, a forward drive position, and a reverse drive position for controlling said electric motor, a trip mechanism controlled by said carriage for actuating said switch from a forward drive to a reverse drive position upon completion of a thread cutting operation and for moving the switch from the reverse drive position to a neutral position upon unthreading of the cutting die off of the pipe, and means for adjusting the trip mechanism to control the length of the threads cut on the pipe before tripping the switch to a reverse drive position.

10. A portable threading tool which comprises an electric motor driven carriage support, a carriage slidable on said support for carrying a cutting tool against the workpiece, an oil reservoir in said carriage, a plunger pump in said carriage effective for pumping oil from the reservoir to a cutting tool carried by the carriage for lubricating the tool, a lever pivoted on said carriage for actuating said pump, said lever having a cam head, a cam roller riding on the cam head of the lever and spring means accommodating shifting of the cam roller off the cam head of the lever whenever the carriage is moved in a direction other than a cutting direction whereby the oil pump is actuated only during a cutting operation.

11. In a portable power driven threading tool the improvement of a detachable starting device which comprises a cup-shaped casing, a piston slidable in said casing, a cam member slidable in said casing, a spring between the cam member and piston, a shaft rotatably mounted in the casing, pins on said shaft acting on the cam device for compressing the spring, and a handle for rotating said shaft.

12. A power tool which comprises a reversible electric motor, means for holding a workpiece, a shiftable cutting tool carriage driven by the motor and movable toward and away from said holding means, a motor switch having a forward position, a reverse position and an off position, a trip mechanism actuated by movement of the tool carriage toward said holding means for moving the motor switch from its forward position to its reverse position and then to its stop position, said trip mechanism being adjustably mounted relative to said tool carriage to selectively control the movement of the tool carriage toward and away from the holding means, whereby upon completion of a predetermined length of cutting movement, the carriage is returned to its starting position and the motor is automatically stopped.

13. A portable electric power driven cutting tool which comprises a generally T-shaped unit having an electric motor in one leg thereof and a work receiving vise and pipe threading tool carriage in opposite ends of the other leg thereof, said other leg adapted to receive a pipe therethrough held by said vise for a pipe threading operation by said carriage, said carriage being movable toward and away from said vise, a detachable loading device removably mounted on said leg for urging said carriage against a workpiece held by said vise, a motor switch for said electric motor having a forward position to energize said motor to rotate the tool carriage in a pipe threading direction, a reverse position to energize said motor for rotating the carriage in an unthreading direction and an off position to stop the motor, trip mechanism for said switch actuated by movement of the carriage toward the vise to move the switch from its forward position to its reverse position and then to its stop position, whereby a pipe held by the vise will be automatically threaded, upon completion of the threading operation, the tool carriage will move back to its starting position off of the pipe, and the motor will then stop.

14. A portable power driven tool which comprises a generally T-shaped unit, an electric motor in one leg of the unit, a vise and cutting tool carriage in the other leg of the unit at opposite ends thereof, said motor rotating said carriage relative to said vise, means slidably supporting said carriage on said other leg of the unit for movement toward and away from the vise, an oil pump in said carriage, means projecting from said carriage adapted to be tripped for actuating said oil pump, tripping mechanism engaging said means when the carriage is moving toward the vise and released from said means when the carriage is moving away from said vise, a cutting tool removably carried by said carriage adapted to receive oil from the oil pump for lubricating a cutting operation, means for automatically reversing said motor at the completion of a cutting operation for returning the carriage to its starting position, and means for stopping said motor when the carriage returns to its starting position.

15. In a power tool having a support member carrying a vise and a tool carriage slidably mounted on said support member toward and away from said vise, the improvement of a quick detachable starting device removably mounted on said support member to overlie said carriage, spring means in said starting device for acting on said carriage to urge the same toward said vise, cam means for compressing and releasing said spring means, and a rotatable actuator for said cam means.

References Cited by the Examiner

UNITED STATES PATENTS

| | | | |
|---|---|---|---|
| 1,760,382 | 5/1930 | Teesdale. | |
| 1,852,776 | 4/1932 | Hodeaux | 10—89 |
| 2,279,462 | 4/1942 | Holland et al. | 10—136 |
| 3,162,872 | 12/1964 | Adelman | 10—126 |

FOREIGN PATENTS

| | | |
|---|---|---|
| 123,358 | 9/1901 | Germany. |
| 840,341 | 6/1952 | Germany. |

ANDREW R. JUHASZ, *Primary Examiner.*